April 1, 1969 G. A. JORDAN 3,435,715

CUTTING TOOL

Filed June 26, 1967

INVENTOR.
GALEN A. JORDAN

BY

*Edward E. McCullough*
AGENT

United States Patent Office 3,435,715
Patented Apr. 1, 1969

3,435,715
CUTTING TOOL
Galen A. Jordan, Ogden, Utah, assignor to Thiokol Chemical Corporation, Bristol, Pa., a corporation of Delaware
Filed June 26, 1967, Ser. No. 648,815
Int. Cl. B23b 29/034; E21b 9/26
U.S. Cl. 77—58                                      1 Claim

ABSTRACT OF THE DISCLOSURE

A tool is provided for cutting cavities. The cutter of the tool is mounted on two flexible members which can be extended from or retracted toward a tubular housing, thereby permitting the tool to be inserted into the workpiece through a small opening therein.

---

This invention relates to a machine for shaping a cavity in a workpiece and more particularly to a machine for shaping the combustion cavity in a solid propellant rocket motor.

In the manufacture of solid-propellant rocket motors it is frequently necessary to form in a solid propellant grain an internal cavity which communicates with the exterior of the grain through a relatively small opening, usually that of the thrust nozzle throat. It has been a general practice to place in a rocket motor casing a mandrel having the shape of the cavity to be formed and then to pour liquid propellant between this mandrel and the casing, the propellant then being cured to the solid state and the mandrel withdrawn thereafter. Although such mandrels are expensive to make, often they must be discarded after a preliminary test of the rocket motor formed therewith has proved its cavity design to be unsatisfactory. Furthermore, mandrels are sometimes difficult to remove from the propellant in which they are positioned, particularly when the combustion cavity decreases in diameter toward the end of the propellant grain from which the mandrel must be removed.

Because of the aforementioned disadvantages associated with the forming of solid propellant combustion cavities by means of removable mandrels, such cavities have in the past also been formed by machining operations, in which either the propellant grain or a cutting tool is rotated. In either case, there has been a need for a cutting tool sufficiently compact to be inserted and removed from a small hole in a propellant grain, yet having the capacity to cut a large cavity within the grain. The present invention provides a cutting tool having a tubular housing into which the cutting bit may be fully retracted, so that the diameter of the opening in the propellant grain need be only as large or slightly larger than the diameter of the tubular housing. The cutter bit is mounted on flexible members that extend longitudinally of the tubular housing when the tool is in its collapsed position, thereby allowing the tool to have minimal diameter.

Accordingly, it is an object of this invention to provide a cutting tool for shaping a combustion cavity in a solid propellant grain.

Another object of this invention is to provide a cutting tool which is compact in its collapsed position.

Still another object of this invention is to provide a cutting tool having an uncomplicated means for precisely regulating its depth of cut.

Figure 1:
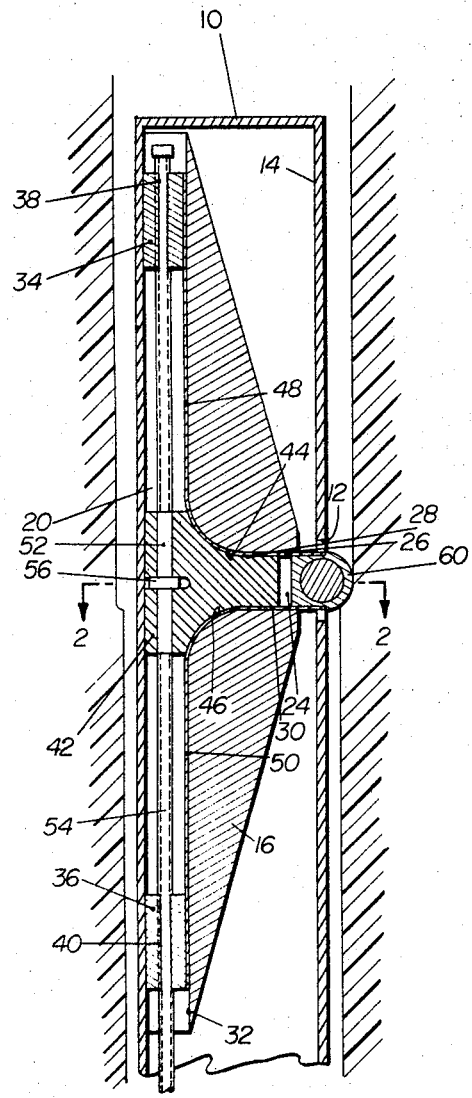
Figure 2:
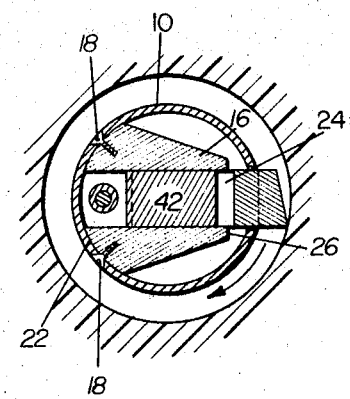

The preferred embodiment of the invention will be described with reference to the accompanying drawings wherein:

FIGURE 1 is a cross-sectional view of a preferred embodiment illustrated in use for shaping the central perforation of a solid propellant rocket motor, and FIGURE 2 is a cross-sectional view of the same embodiment taken along line 2—2 of FIGURE 1 and in the direction indicated by the arrows.

Throughout the specification and the drawings, like reference numbers designate like parts.

As illustrated in the figures, the cutting tool comprises a tubular housing 10 which has an aperture 12 in its wall 14. A first guide block 16 is fixed inside housing 10 by means of a plurality of screws 18, only two of which are shown (see FIGURE 2). A slot 20 extends along the side 22 of first guide block 16 which abuts housing 10 and a transverse passage 24 extends from said slot to the opposite side 26 of guide block 16. Passage 24 is formed with parallel side walls 28 and 30 faired into the bottom wall 32 of slot 20.

First and second feed blocks 34 and 36 are shaped to slide in slot 20, three longitudinal sides of each block being flat and the other side being arcuate to conform to curve of wall 14 of housing 10. Aligned holes 38, 40 are formed in first and second feed blocks 34 and 36, respectively, the holes having opposed threads and axes parallel to the longitudinal walls of slot 20.

A second guide block 42 is disposed in slot 20 and passage 24 of first guide block 16. Surfaces 44 and 46 of second guide block 42 conform to and are spaced from walls 28, 30, respectively, of first guide block 16. The spaces between surfaces 44, 46 and walls 28, 30 form first and second guide slots through which pass first and second flexible members 48, 50, respectively. Second guide block 42 is formed with a hole 52 aligned with holes 38 and 40, but this hole, unlike the latter holes is not threaded. A shaft 54 is rotatably mounted in holes 38, 40 and 52, said shaft having a portion of its length threaded in the same direction as the thread in hole 38 and engaged therewith, and a portion of its length threaded in the same direction as the thread in hole 40 and engaged therewith. As illustrated in the figures, in the preferred embodiment of the invention shaft 54 is restrained from longitudinal movement by means of the collar 56, which is locked on the shaft by some suitable means, such as a set-screw. Collar 56 is shown disposed in a slot in second guide block 42. However, other means will suffice for the same purpose, such as, for example, two collars mounted on shaft 54 and abutting the ends of second guide block 42.

One end of first flexible member 48 is connected to first feed block 34. Similarly, one end of second flexible member 50 is connected to second feed block 36. To the other ends of the flexible members is fixed cutter 60, which is adapted to cut when moved in the direction indicated by the arrow in FIGURE 2.

In the figures the solid-propellant of a rocket motor is symbolized as being formed of a synthetic resin or plastic, but is not intended to limit the use of this invention to the cutting of such materials. To shape a cavity in the propellant, housing 10 can be rotated about its longitudinal axis or the rocket motor can be rotated about the housing. In either case, the housing may be conveniently moved longitudinally to widen the cavity. The depth of cut is regulated by rotation of shaft 54, which, depending upon the direction of rotation, moves first and second feed blocks toward or away from one another, in turn extending or retracting first and second flexible members through their guide slots and thereby positioning cutter 60 as desired.

It will be recognized that the tool cutter can be fabricated of a wide range of materials. It is preferred that first and second flexible members 48, 50 be formed from spring steel. Those skilled in the art will also recognize that the invention can be used to shape many intricately-formed cavities in rocket motors, and that its compactness advantageously allows it to be inserted into the workpiece through a small hole.

Although a preferred embodiment has been described and illustrated, the scope of the invention is intended to be limited only by the following claim.

What is claimed is:
1. A cutting tool comprising:
   a tubular housing having an aperture formed therein;
   a first guide block fixedly mounted inside said housing and abutting one side thereof, said first guide block being formed with a slot extending longitudinally along the side thereof abutting said housing and with a transverse passage extending from said slot to the side of said guide block remote from said slot, said passage having parallel side walls faired into the bottom wall of said slot;
   a first feed block slidably mounted in said slot between one end thereof and said passage, said first feed block being formed with a right-hand threaded hole in the axis of which is parallel to the walls of said slot;
   a second feed block slidably mounted in said slot between the other end thereof and said passage, said second feed block being formed with a left-hand threaded hole coaxial with said hole in said first feed block;
   a second guide block disposed in said slot and said passage of said housing, said second guide block being formed with surfaces conforming to and spaced from said parallel and faired walls of said passage, thereby forming first and second guide slots each extending from said longitudinal slot in said first guide block to the side of the latter remove from said longitudinal slot, said second guide block also being formed with a hole coaxial with said holes in said first and second feed blocks;
   a cutter disposed in said aperture in said housing;
   a first flexible member fixedly attached at one end thereof to said first feed block and at the other end thereof to said cutter, said first flexible member passing through said first guide slot;
   a second flexible member fixedly attached at one end thereof to said second feed block and at the other end thereof to said cutter, said second flexible member passing through said second guide slot;
   a shaft rotatably mounted in said holes in said first feed block, second feed block, and second guide block, said shaft having a right-hand threaded portion engaging said right-hand threaded hole in said first feed block and a left-hand threaded portion engaging said left-hand threaded hole in said second feed block whereby rotation of said shaft causes said cutter to extend from or retract toward said housing; and
   a collar fixedly mounted on said shaft and disposed in said slot in said second feed block to prevent longitudinal movement of said shaft in said housing.

References Cited
UNITED STATES PATENTS

| | | | |
|---|---|---|---|
| 1,002,153 | 8/1911 | Jam | 77—58 |
| 1,069,986 | 8/1913 | Sternad | 77—58 |
| 2,698,733 | 1/1955 | Schlumberger | 175—285 |

GERALD A. DOST, *Primary Examiner.*

U.S. Cl. X.R.

166—55.7; 175—285